United States Patent [19]
Chao et al.

[11] Patent Number: 6,060,415
[45] Date of Patent: *May 9, 2000

[54] ALIGNED MOLECULAR SIEVE CRYSTALS GROWN ON ANODIC ALUMINA MEMBRANE

[75] Inventors: Kuei-Jung Chao, Hsin-Chu; Chih-Ning Wu, Taipei; Han-Chang Shih, Taipei; Tzeng-Guang Tsai, Taipei, all of Taiwan

[73] Assignee: National Science Council, Taipei, Taiwan

[*] Notice: This patent issued on a continued prosecution application filed under 37 CFR 1.53(d), and is subject to the twenty year patent term provisions of 35 U.S.C. 154(a)(2).

[21] Appl. No.: 08/796,470

[22] Filed: Feb. 10, 1997

[51] Int. Cl.$^7$ .............. B01J 20/28; B01J 29/04; B01J 29/06; B01J 27/182

[52] U.S. Cl. .............. 502/4; 502/60; 502/64; 502/69; 502/214; 502/247

[58] Field of Search .............. 502/4, 60, 64, 502/69, 214, 247

[56] References Cited

U.S. PATENT DOCUMENTS

| | | | |
|---|---|---|---|
| 4,310,440 | 1/1982 | Wilson et al. | 252/435 |
| 4,699,892 | 10/1987 | Suzuki | 502/4 |
| 4,861,743 | 8/1989 | Frank et al. | 502/214 |
| 4,921,823 | 5/1990 | Furneaux et al. | 502/4 |
| 5,019,263 | 5/1991 | Haag et al. | 210/500.25 |
| 5,258,339 | 11/1993 | Ma et al. | 502/4 |
| 5,360,474 | 11/1994 | Lauth et al. | 106/402 |
| 5,374,411 | 12/1994 | Davis et al. | 423/306 |
| 5,429,743 | 7/1995 | Geus et al. | 210/490 |
| 5,464,798 | 11/1995 | Jia et al. | 502/64 |
| 5,567,664 | 10/1996 | Barri et al. | 502/4 |

OTHER PUBLICATIONS

Geoffrey A. Ozin, "Nanochemistry: synthesis in diminishing dimensions", *Advanced Materials*, 4, No. 10 (1992), p. 612.

Sano, et al. "New preparation Method for Highly Siliceous Zeolite Films", *J. Mater. Chem.*, 2, No. 1(1992), pp. 141–142.

Geus, et al, "Synthesis and characterization of zeolite (MFI) membranes on porous ceramic supports", *J.Chem. Soc. Faraday Trans.* 88, No. 20(1992), pp. 3101–3109.

Jia, et al, "Preparation and characterization of thin–film zeolite–PDMS composite membranes", *Journal of Membrane Science*, 73 (1992), pp. 119–128.

Sano, et al, "Preparation and characterization of ZSM-5 zeolite film", *Zeolites*, vol. 11, Nov./Dec. 1991, p. 842.

K.V.Heber, "Studies on porous $Al_2O_3$ growth–I. physical model", *Electrochemica Acta*, vol. 23 (1978), pp. 127–133.

K.V.Heber, "Studies on porous $A_2O_3$ growth–II. ionic conduction", *Electrochemica Acta.* vol. 23 (1978), pp. 135–139.

Keller, et al, "Structural features of oxide coatings on aluminum", *J.E.S.* 100(1953), p. 411.

Masuda, et al, "Preparation of an A–type zeolite film on the surface of an alumina ceramic filter", *Microporous Materials*, 3, 1995, pp. 565–571 1.

(List continued on next page.)

*Primary Examiner*—Steven P. Griffin
*Assistant Examiner*—Cam N. Nguyen
*Attorney, Agent, or Firm*—Bucknam and Archer

[57] ABSTRACT

The present invention provides a molecular sieve composite membrane, which includes an anodic alumina membrane as a support and the uni-directionally oriented molecular sieve membrane grown in situ on the anodic alumina membrane. The close packing transitional metal containing aluminophosphate AFI molecular sieve crystals have successfully been grown on the anodic alumina. The molecular sieve phase bounded strongly and anchored into the anodic alumina membrane. Besides, the specific cylindrical channels of the anodic alumina membrane provides the template function to orient the growth of molecular sieves.

10 Claims, 10 Drawing Sheets

OTHER PUBLICATIONS

"The smallest chemical plants", *Material Science*, vol. 263, Mar. 1994, p. 1698.

Valtchev, et al, "Influence of reactive radicals in cellulose fibres on the formation of zeolite coatings", *J. Chem. Soc., Chem. Commun.*, 1994, p. 2087.

Feng, et al, "Vertical aluminophosphate molecular sieve crystal grown at inorganic–organic interfaces", *Science*, vol. 265, Sep. 1994, p. 1839.

Jia, et al, "Ceramic zeolite composite membranes: Preparation, characterization and gas permeation", *Journal of Membrane Science*, 82 (1993), pp. 15–26.

Scandlella, et al, "Alignment of Single–Crystal Zeolites by Means of Microstructured Surfaces", *Advanced Maerials*, 8, No. 2(1996), p. 137.

Advanced Materials, "Contents", vol. 8, (1996), p. 101.

Yang, et al, "Free–standing and oriented mesoporous silica films grown at the air–water interface", *Letters To Nature*, vol. 381(1996), p. 589.

Yang, et al, "Synthesis of oriented films of mesoporous silica on mica", *Letters To Nature*, vol. 379(1996), p. 703.

Girnus, et al, "Synthesis of $AlPO_4$–5 Aluminumphosphate Molecular Sieve Crystal for Membrane Applications by Microwave Heating", *Advanced Materials*, 7, No. 8(1995), p. 711.

Oriented Growth of Molecular Sieves on Inorganic Membranes by Chih–Ning Wu, et al., Advanced Materials, 1996, 8, No. 12.

ALIGNED MOLECULAR SIEVE CRYSTALS GROWN ON ANODIC ALUMINA MEMBRANE

BACKGROUND OF THE INVENTION

1. Field of the Invention

The present invention relates to a novel molecular sieve composite membrane, more particularly to a composite membrane comprising an anodic alumina membrane as a templating support, as well as the vertically-oriented and closely-packed molecular sieve crystals grown in situ on anodic alumina membrane by a hydrothermal method, any pre- or post-treatments and modifications of substate is not required. This tailor-made synthesis is initiated by crystal growth in a geometrically confined environment, i.e., 200-nm-pore-diameter cylindrical channels of the support.

2. Description of the Prior Art

Crystalline zeolite and zeolite-like molecular sieves are aluminosilicate- and aluminophosphate-based materials with uniform intra-framework cages and channels of microporous or mesoporous size. With tailor-made acidity, specific pore structure and high thermal stability, they have been used as a unique type of catalysts for traditional, shape-selective chemical reaction of guest hydrocarbon molecules, especially in petroleum refining and petrochemical industry. Recently, attention has focused on the promising applications where molecular sieve crystals can serve as a potential nanometer or smaller sized host for the manufacture of advanced materials such as organized metal clusters, metal oxides or metal sulfides, conducting polymers, and trapped supra-molecular compounds that exhibit specific optic, optoelectronic and electrochemical properties and endow for devices of molecular wires, quantum electronics and nonlinear optics (*Science*, 263, 1698 (1994), *Adv. Mater.*, 4, 612 (1992)).

To control exquisitely over chemical reactions and improve significantly the production of devices on the smallest scale, a technological challenge now is to be able to produce the zeolites or zeolite-like molecular sieves in the form of giant perfect single crystals or high quality thin films, rather than tiny powder forms prepared under conventional synthetic conditions. However, the synthesis of large single crystals is limited, the elaborate preparation of a continuous polycrystalline zeolite membranes has thus attracted much attention.

Much effort has been put into the preparation of molecular sieve membrane, for example: synthesis of composite zeolite films by embedding zeolite crystals in plastic materials (*J. Membrane Sci.*, 73, 119 (1992)) and the in situ growth of zeolites on porous ceramic substrates by E. R. Geus et al. (*J. Chem. Soc. Faraday Trans.*, 88, 3101 (1992), *J. Membrane Sci.*, 82, 15 (1993), *J. Chem. Soc., Chem. Commum.*, 339 (1994), *Microporous Mater.* 3, 565 (1995)). The performance of these films is not quite satisfactory due to either the insufficient formation of zeolite crystals or the substrate having low porosity. Zeolite films with/without cellulose moulding were synthesized by T. Sano et al.(*Zeolites*, 11, 842 (1991), *J. Chem. Soc., Chem. Commun.*, 2087 (1994)), these zeolite films were found to be either out of control in shape or lack of the mechanical strength.

Besides shape-selective catalysis and adsorption, the molecular sieve membranes can be used as hosts to orient guest atom cluster and molecules and can be considered as the promising template for sensor, conductor and non-linear optical materials. The advantage of preferred orientation of the guest molecules can be macroscopically improved by aligning the molecular sieve host crystals. Furthermore, it is also noteworthy that the use of this type of zeolite membranes on reaction and separation may have better performance than traditional zeolite powder and may lead to the new applicable industrial processes. However, preparation of a continuous film of controlled-orientation molecular sieve crystals on a porous substrate seems difficult. Increasing attempts have been made to develop aligned molecular sieve crystals, especially in a membrane form. For instance, pre-grown crystals of molecular sieves MFI and AFI were uni-directionally oriented by an electric field and then fixed by an epoxy resin film (*Adv. Mater.*, 7, 711 (1995)); crystals of zinco-(or alumino-) phosphate molecular sieves were grown along(111) planes on gold surface that has been modified with organophosphate multilayer films (*Science*, 265, 1839 (1994), *Nature*, 368, 834 (1994)); crystals of MFI were observed to be ordered by mean of properly treated microstructured surfaces (*Adv. Mater.*, 8, 137 (1996)); films of aligned mesoporous zeolite were prepared on the freshly cleaved mica(*Nature*, 379, 703(1996)) or at the air-water interface(*Nature*, 381, 589(1996)). Most of these methods needed the pre- or post-treatments and modifications of substrate.

SUMMARY OF THE INVENTION

A novel method, for preparing the aligned molecular sieve composite membrane, has now been reported. The anodic alumina, with uniform 200-nm-pore-diameter straight channels and high porosity (about 30~50%), was used as the support for the in situ growing the oriented molecular sieve crystals. Because of its specific pore structure, compact nature, as well as thermal and chemical stability, anodic alumina has been used as the support of sufficient mechanical strength to resist the stress induced by molecular sieve growth, and abundant cylindrical pores and OH function groups to accelerate the rate of molecular sieve synthesis.

Synthesis conditions such as temperature, dilution degree of solution, chemical composition (especially, template concentration) and reactant source will influence the crystal nucleation rate and transportation of nutrients for the synthesis of zeolite through the nanometer-sized channels of substrate. By controlling these factors, the oriented growth of transitional metal containing aluminophosphate crystals in bundles are achieved, not only with their c-axes vertical to the substrate, but their a- and b-axes also aligned to a substantial extent.

BRIEF DESCRIPTION OF THE DRAWINGS

Tab. 1 is the structural parameters of AFI and MFI

Tab. 2 is the structural parameters of FAU and MCM-41

c) SEM micrograph of VAPO$_4$-5 crystals with a- or b-axis random-aligned morphology.

Figure 6:
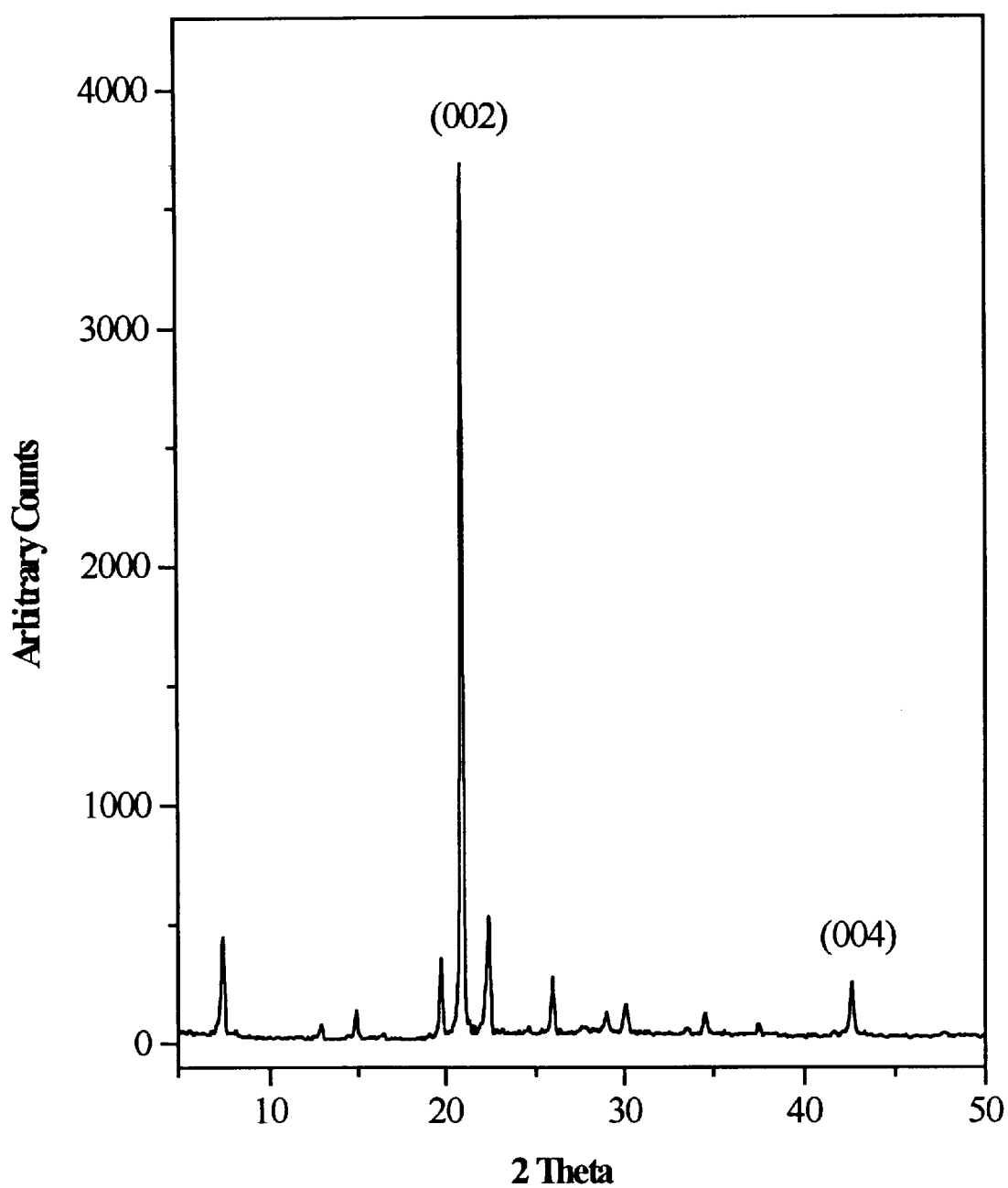

FIG. 6 is a XRD pattern of aligned molecular sieve VAPO$_4$-5 crystals grown on anodic alumina.

Figure 7:
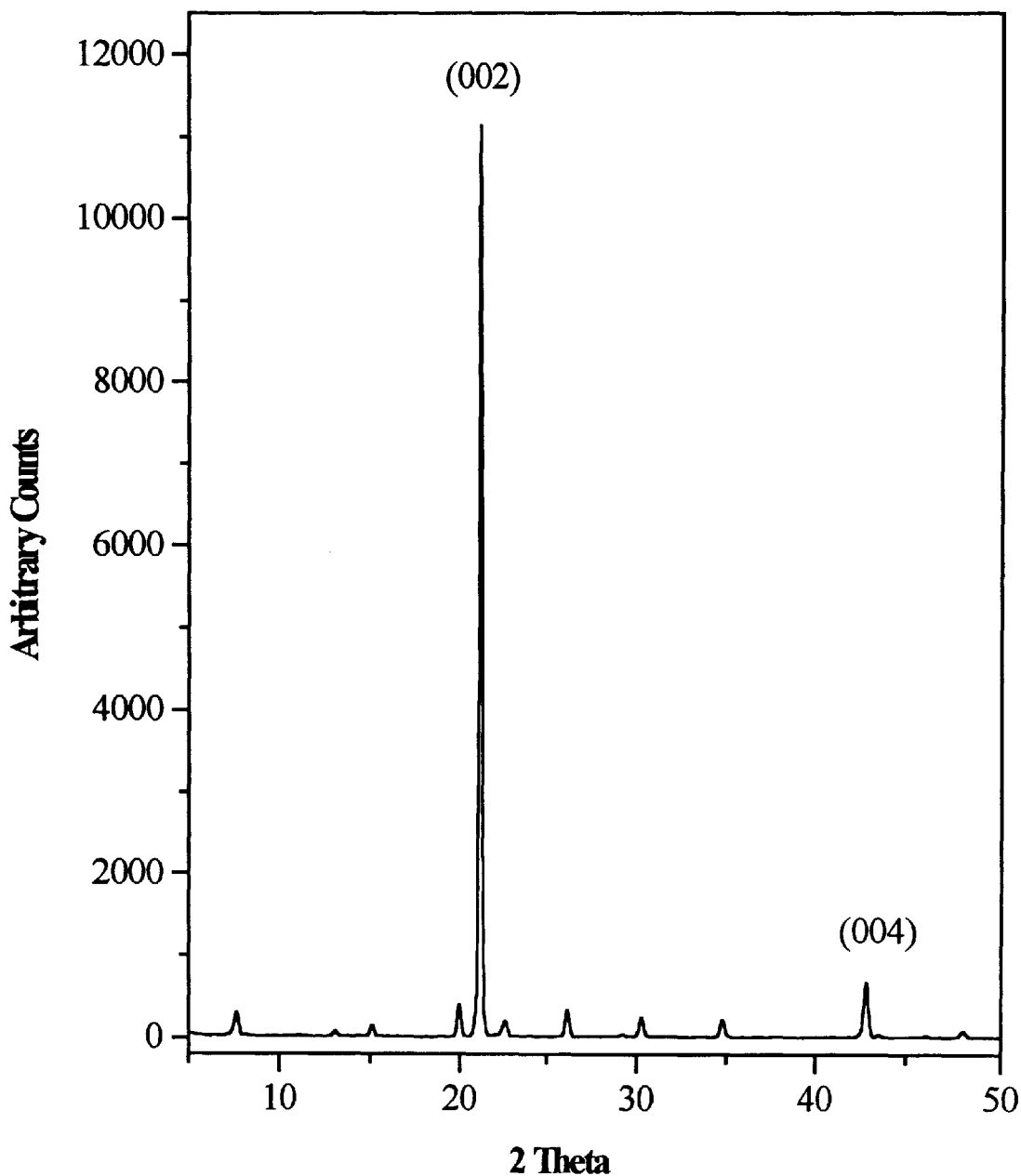

FIG. 7 is a XRD pattern of aligned molecular sieve CoAPO$_4$-5 crystals grown on anodic alumina.

Figure 8:
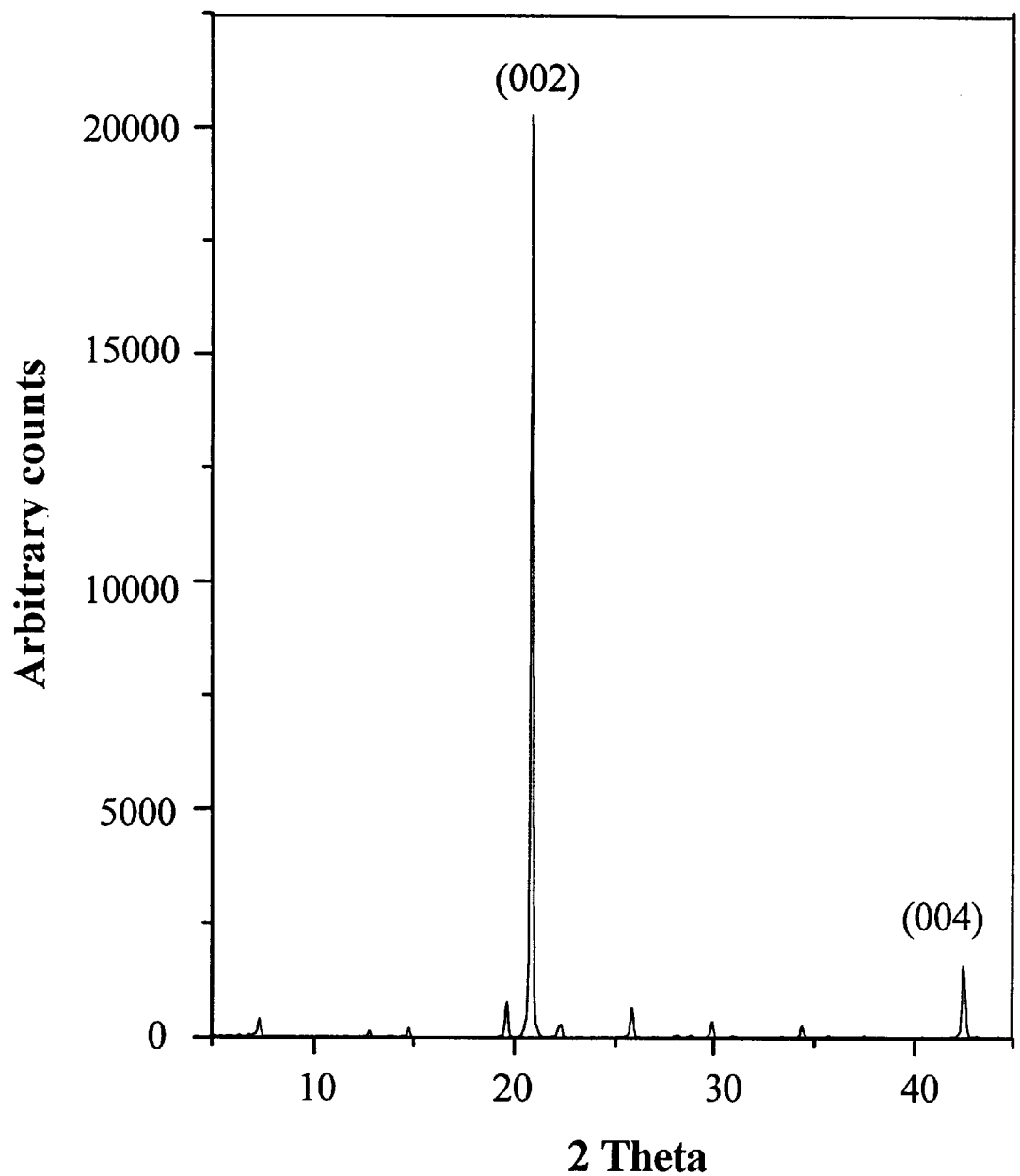

FIG. 8 is a XRD pattern of aligned molecular sieve AlPO$_4$-5 crystals grown on anodic alumina.

Figure 9:
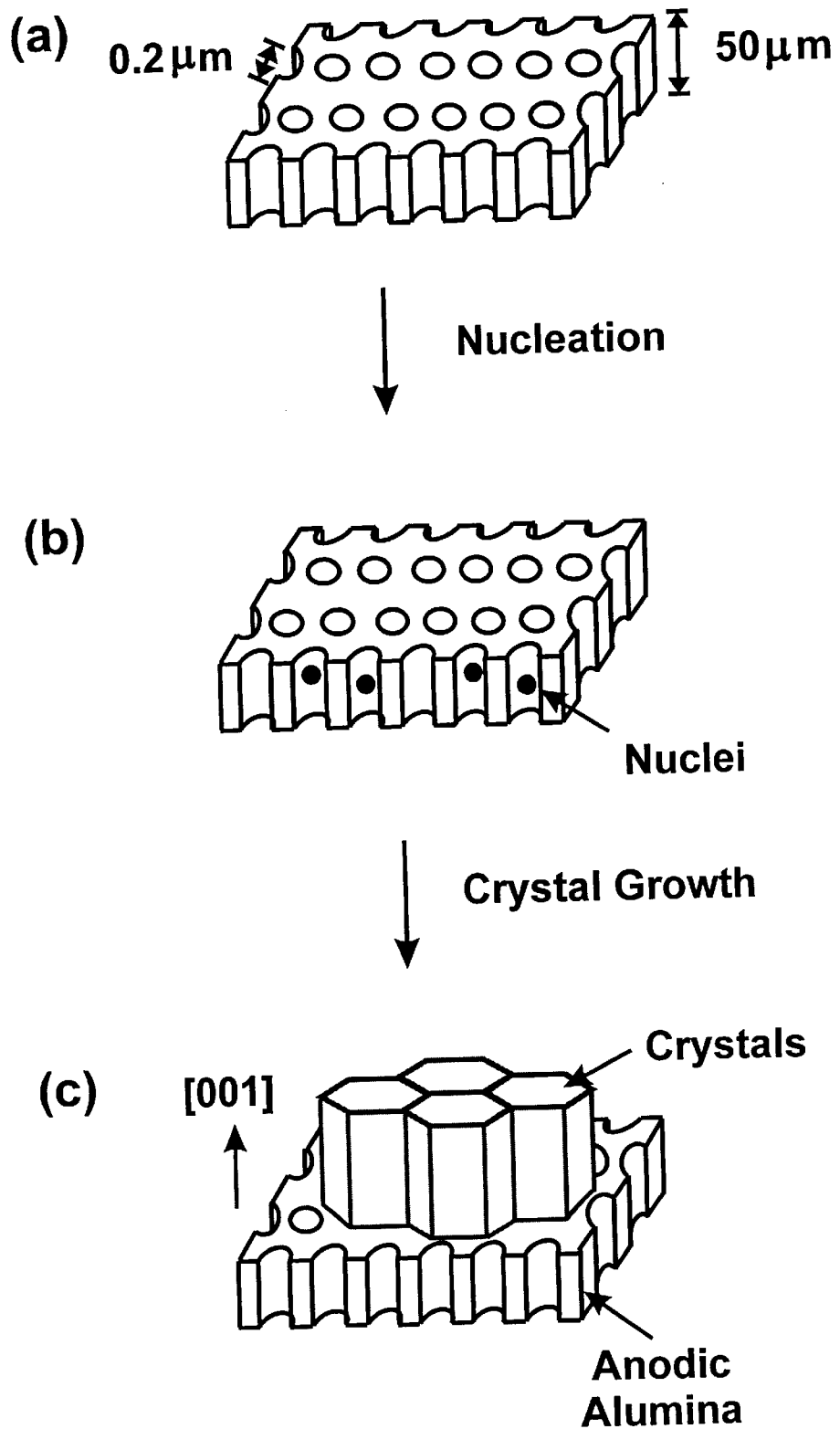

FIG. 9 is a Proposed synthetic scheme for the vertically-aligned molecular sieves grown on anodic alumina membrane.

a) The structure of anodic alumina membrane.

b) Crystal nucleation inside the cylindrical channels of anodic alumina membrane.

c) Hexagonal crystals of AFI (VAPO$_4$-5, CoAPO$_4$-5 or AlPO$_4$-5) grown on the surface of anodic alumina membrane.

DETAILED DESCRIPTION OF THE INVENTION

The aligned molecular sieve composite membrane of the present invention includes an anodic alumina membrane as a suppport, and the uni-directionally oriented molecular sieve crystals grown in situ and in bundles on the anodic alumina membrane.

The anodic alumina membrane used in the present invention can be prepared from anodization of aluminium metal or aluminum alloy. The anodization process is frequently completed by reacting an aluminium metal or aluminum alloy with phosphoric acid or with a phosphoric acid-containing solution. Anodic porous alumina with channels of diameter around 200 nm and density about $10^9$–$10^{10}$ holes per cm$^2$ was prepared by anodic oxidation of aluminum in an aqueous phosphoric acid mixture. The well-prepared anodic porous alumina membrane(thickness of ~50 μm) is of the typical self-organized fine structure with a packed array of columnar hexagonal cells, straight-through and uniform channels. Furthermore, the obtained anodic alumina membrane can be modified by a heat treatment, thermochemical treatment or chemical surface treatment. Use of an anodization process of an aluminium metal or aluminum alloy to yield anodic alumina membrane is a well-established technique and has been discussed extensively in the literature (*J. Electrochem. Soc.*, 100, 411 (1953), *Electrochimica Acta*., 23, 127 (1978), ibid., 23, 135(1978)). However, the porous anodic alumina membrane has never been used as the support for growing molecular sieve composite membranes.

The aligned molecular sieve crystals of the present invention are hydrothermally grown in situ on the anodic alumina support. Molecular sieves may have channel- or caged-typed micropore structure. Examples of the molecular sieves having one-dimensional channel-typed micropore structure include AlPO$_4$-5, AlPO-11, VPI-5, mordenite and Nu-10. Examples of the molecuular sieves having two-dimensional channel-typed micropore structure include ZSM-5 and silicalite. Examples of the molecular sieves having three-dimensional cage-typed micropore structure include zeolite A, zeolite X and zeolite Y.

The crystalline aluminophosphate-based AlPO$_4$-5 (AFI) molecular sieve(space group P6cc) consists of alternating alumina and phosphate tetrahedra connected into 12-membraned-ring channels (diameter of 7.3 Å) parallel to c-axis. Without a net charge, it is not expected to have balancing cations in framework void space and ion-exchange capacity. However, the isomorphic substitution of Al$^{3+}$by Co$^{2+}$(CoAPO$_4$-5) and P$^{5+}$by V$^{4+}$(VAPO$_4$-5) will generate the Brønsted acidity and ion-exchange capacity in the originally neutral aluminophosphate molecular sieves. These properties may endow the composite membranes with catalytic ability (*J. Chem. Soc. Faraday Trans.*, 88, 2949, (1992)).

Growing the molecular sieve membrane in situ on the anodic alumina membrane invoves immersing the anodic alumina membrane in a solution containing a synthetic mixture which can be reacted to obtain molecular sieve. The growing is performed in a Teflon-lined stainless-steel autoclaves without stirring under autogenous pressure at 150–190° C. for 1–2 days. For the molecular sieve VAPO$_4$-5, the synthetic mixture may consist of aluminium isopropoxide (or pseudoboehmite), phosphoric acid, vanadyl sulfate, tripropylamine (Pr$_3$N) and de-ionized water. The reaction mixture of VAPO$_4$-5 has a molar ratio of 1.0~6.0 Pr$_3$N: 0.95–1.0 Al$_2$O$_3$: 0.95–1.0 P$_2$O$_5$: 0.05–0.1 V$_2$O$_5$: 200~600 H$_2$O. For the molecular sieve CoAPO$_4$-5, the synthetic mixture may consist of aluminium isopropoxide (or pseudoboehmite), phosphoric acid, cobalt sulfate, tripropylamine (Pr$_3$N) and de-ionized water. Optionally, the synthetic mixture for growing CoAPO$_4$-5 may include triethylamine (Et$_3$N) and cobalt nitrite. The reaction mixture of CoAPO$_4$-5 has a molar ratio of 1.0~6.0 Pr$_3$N (or Et$_3$N): 0.95–1.0 Al$_2$O$_3$: 0.95–1.0 P$_2$O$_5$: 0.1–0.2 CoO: 200~600 H$_2$O. For the molecular sieve AlPO$_4$-5, the synthetic mixture may consist of aluminium isopropoxide (or pseudoboehmite), phosphoric acid, tripropylamine(Pr$_3$N) and de-ionized water. The reaction mixture of AlPO$_4$-5 has a molar ratio of 1.0~6.0 Pr$_3$N: 0.95–1.0 Al$_2$O$_3$: 0.95–1.0 P$_2$O$_5$: 200~600 H$_2$O.

After the growth of the molecular sieve membrane on the anodic alumina membrane is complete, the obtained molecular sieve composite membranes were washed with de-ionized water under ultrasonic vibration for several times and dried at 100° C. for 1 hour. The samples were further calcined at 500–550° C. for 18–72 hours to remove the organic base occluded in the channels of molecular sieve.

Figure 1A:
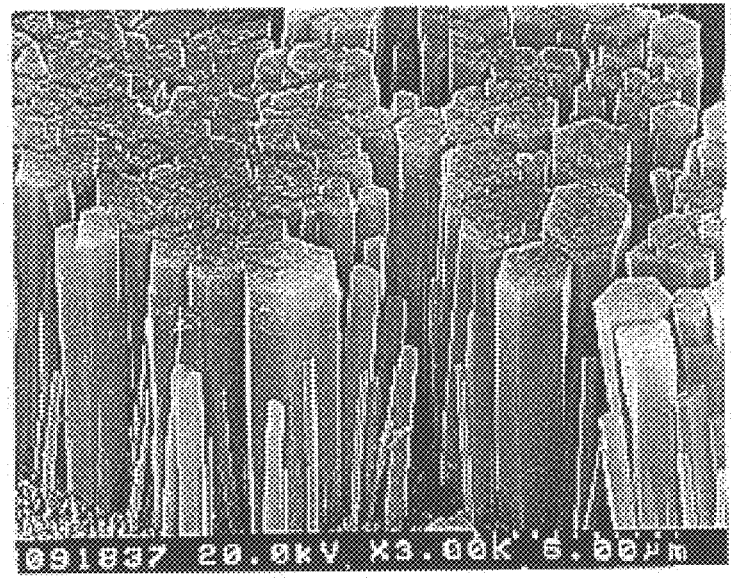
FIGS. 1($a$)–1($b$) are SEM image of the aligned molecular sieve $VAPO_4$-5 crystals grown on anodic alumina.
Figure 1B:
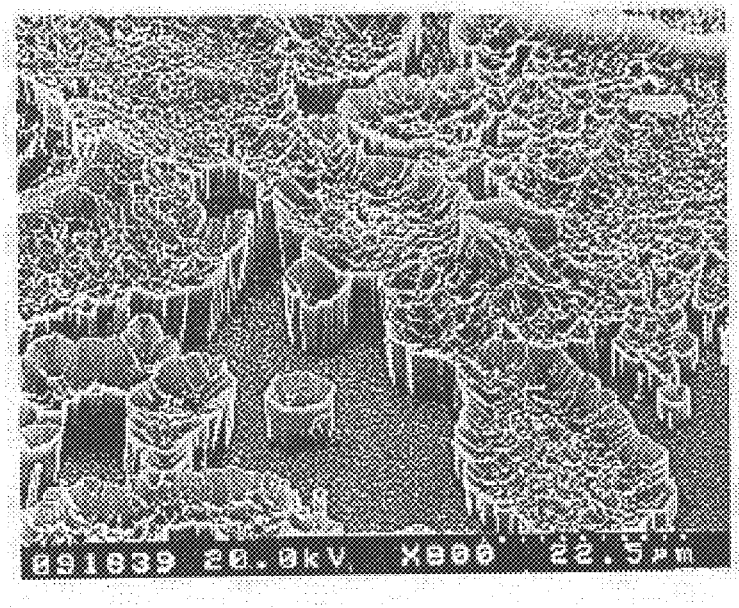
Figure 2A:
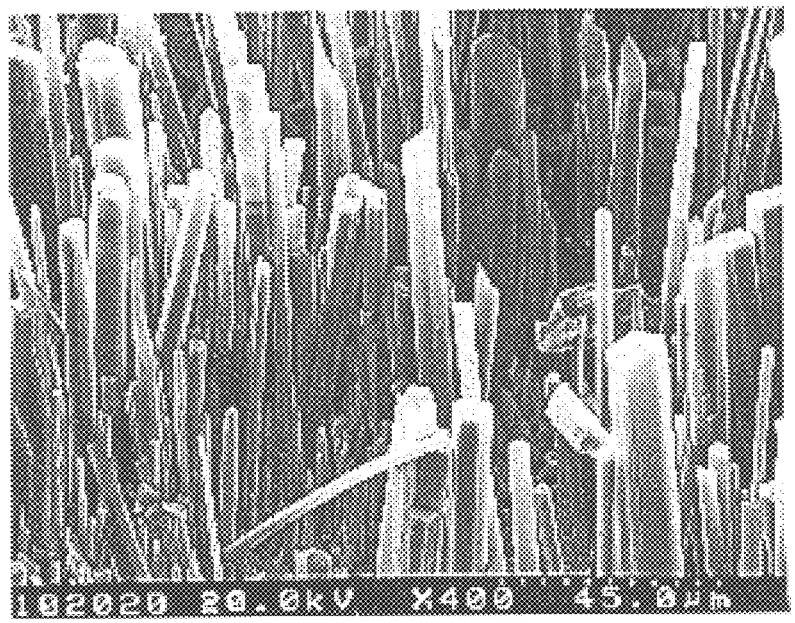
FIGS. 2($a$)–2($b$) are SEM image of the aligned molecular sieve $CoAPO_4$-5 crystals grown on anodic alumina.
Figure 2B:
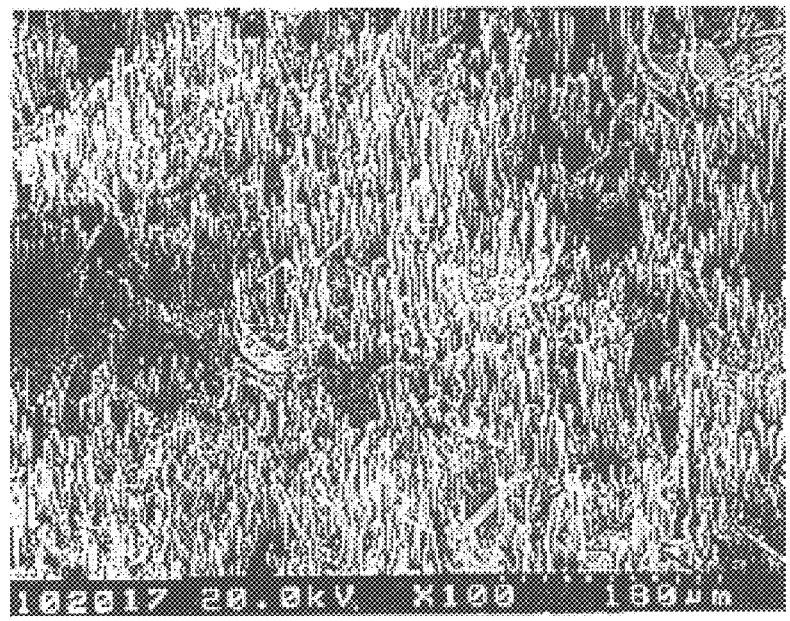
Figure 3A:
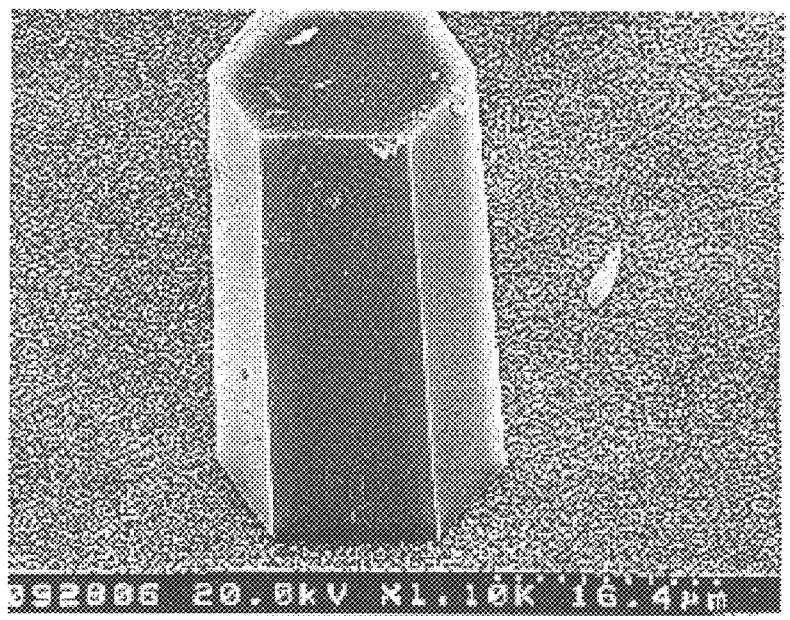
FIGS. 3($a$)–3($b$) are SEM image of the aligned molecular sieve $AlPO_4$-5 crystals grown on anodic alumina.
Figure 3B:
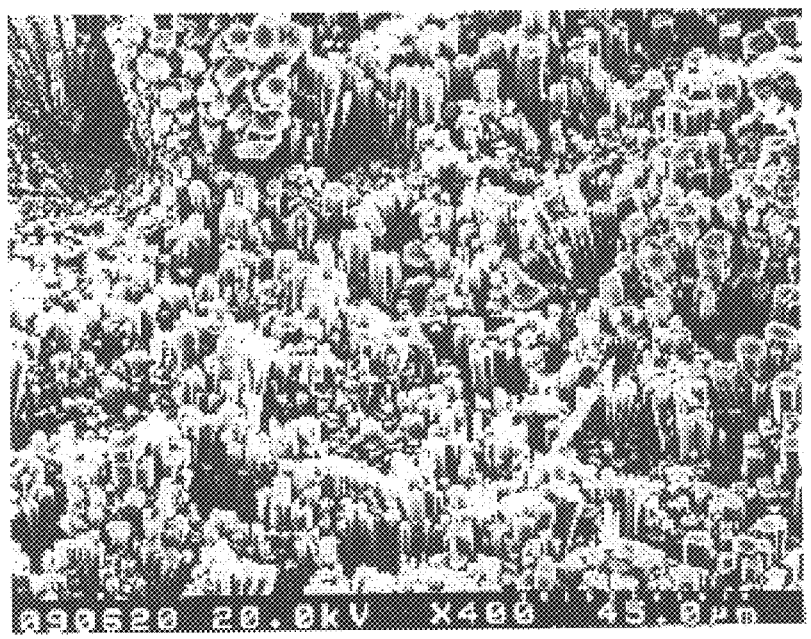

The growth of VAPO$_4$-5, CoAPO$_4$-5 or AlPO$_4$-5 molecular sieve membrane is perpendicular to the anodic alumina support, and the integrities of the anodic alumina was still maintained. The aligned molecular sieve crystals in bundles on the anodic alumina are grown a close packing layer covering the support (as shown in following FIG. 1, FIG. 2 and FIG. 3). As shown in these micrographs, molecular sieve crystals were found to survive hours of ultrasonic vibration and they were indeed strongly bonded and were anchored inside the uniform straight channels of anodic alumina. The width and length of individual VAPO$_4$-5 crystal are 0.6–1.8 μm and 6–8.4 μm, respectively(as shown in FIG. 1a). The area of close packing of VAPO$_4$-5 crystals can be up to 80μm×40μm (as shown in FIG. 1b). As for CoAPO$_4$-5, the width of each crystal is approximated 4.5–9μm (FIG. 2a) and the closely packing area can be even up to 626μm× 460μm (FIG. 2b). Hexagonal AlPO$_4$-5 molecular sieve, which are more easily formed as large crystals, exists isolated or in bundles with length of ~30μm and width of ~20μm on anodic alumina support (FIG. 3).

Figure 4A:
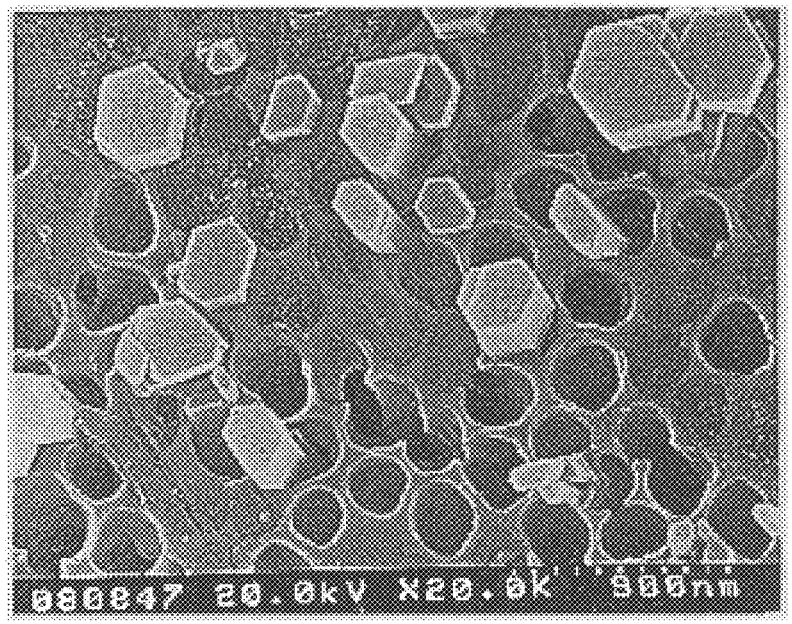
FIGS. 4($a$)–4($b$) show $VAPO_4$-5 crystals anchored inside the straight channel walls of anodic alumina membrane.
Figure 4B:
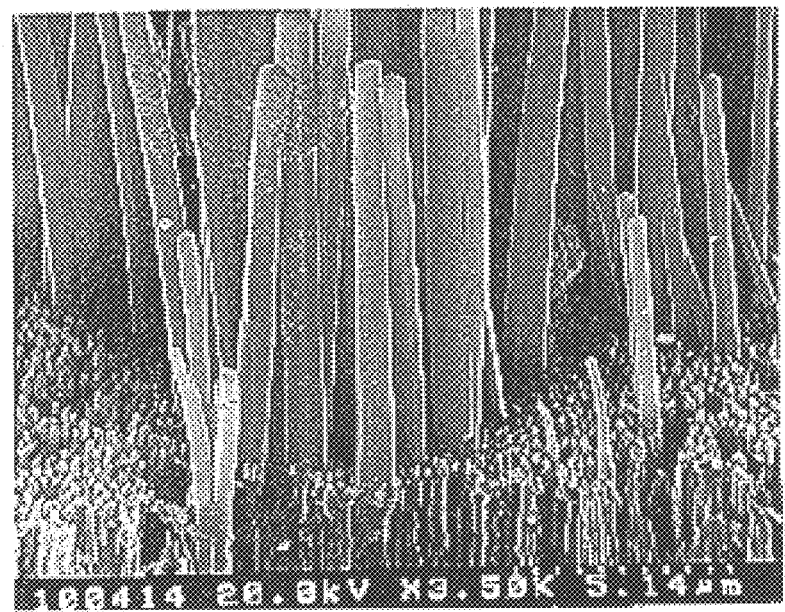

The direct attachment between the molecular sieve crystals and the anodic alumina can be demonstrated, as shown in SEM micrographs of FIG. 4. These hexagonal crystals were found to grow with their one-dimensional channels almost parallel (with few titling angle) to the nanometer-sized cylindrical arrays of anodic alumina support. In the early stage of synthesis, AFI crystals have attached on the surface of porous anodic alumina substrate and strongly bounded to and anchored inside the channels of anodic alumina membrane (as shown in FIG. 4a). Afterwards, they grow further into large and vertically aligned AFI crystals (as shown in FIG. 1, 2 and 3).

Figure 5A:
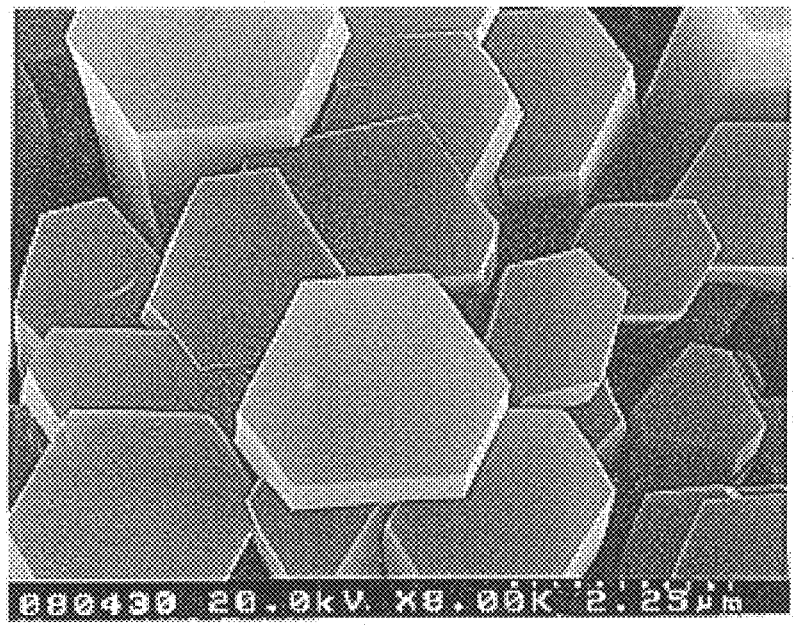
FIGS. 5($a$)–5($c$) are Scanning electron micrographs (top view) of $VAPO_4$-5/anodic alumina composite membrane.
- a) SEM micrograph of $VAPO_4$-5 crystals with different length and with a- or b-axis preferred orientation.
- b) SEM micrograph of $VAPO_4$-5 crystals with same length and with a- or b-axis preferred orientation in certain extent.
Figure 5B:
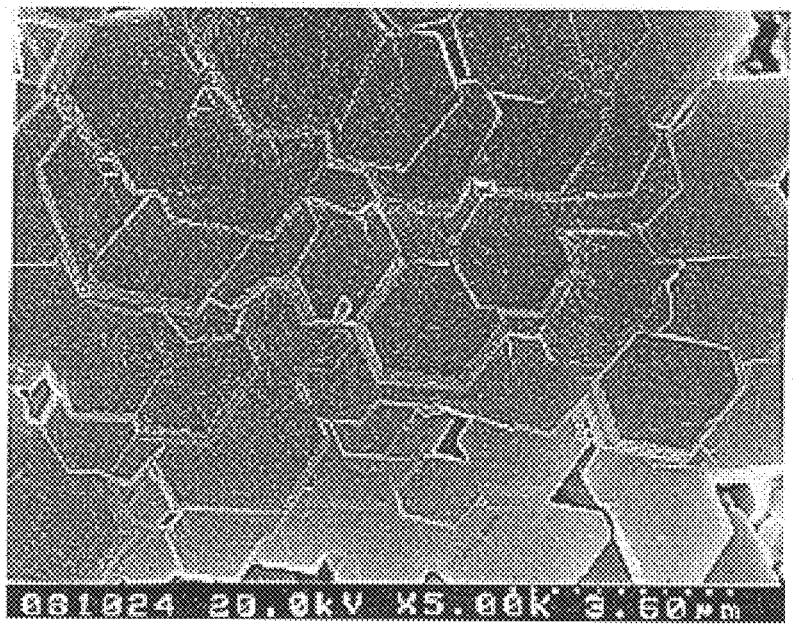
Figure 5C:
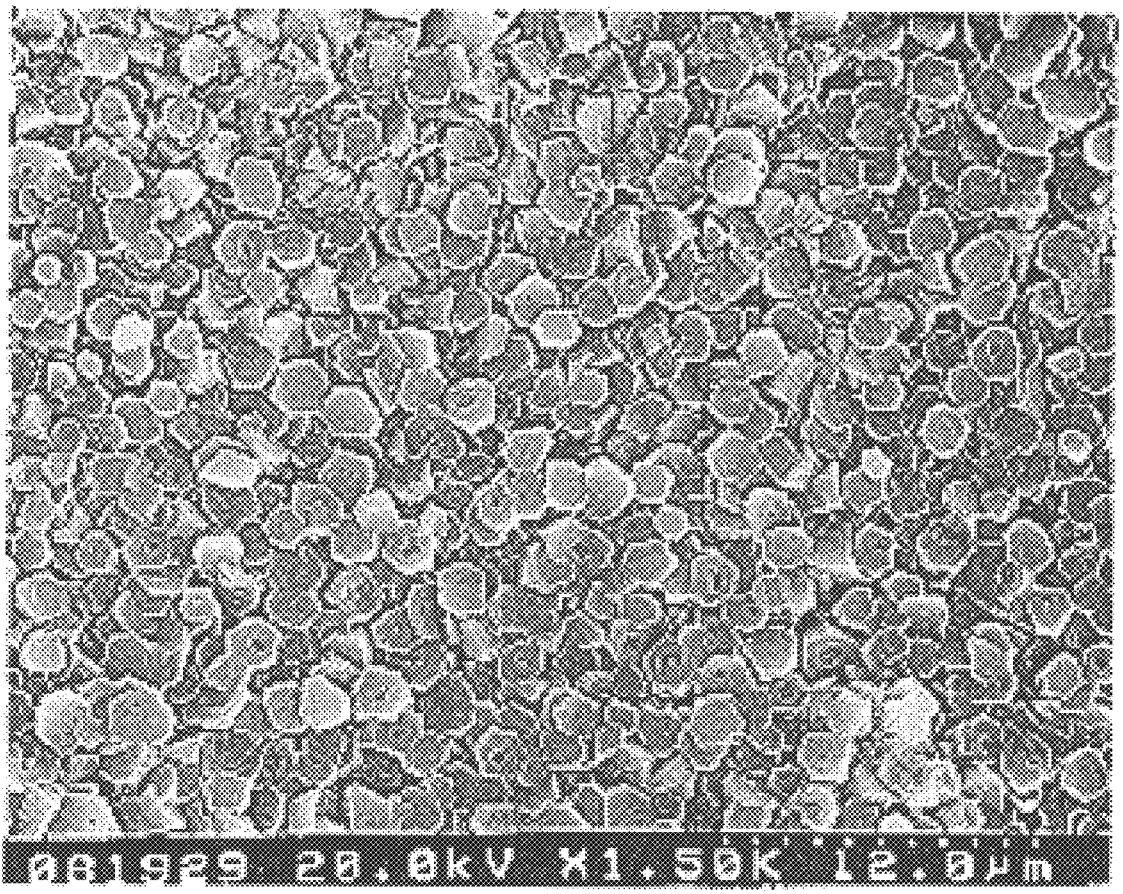

VAPO$_4$-5(CoAPO$_4$-5 or AlPO$_4$-5, not shown here) crystals, with varied length (FIG. 5a) or uniform length (FIG. 5b), are all grown with their c-axes oriented perpendicular to the anodic alumina surface, and with their a- and b-axes also orderly aligned to certain degree. By varying the distance between the substrate and the surface of reactant mixture, or the compositions of the reactant gel, the orientation of a- and b-axes of surface-grown crystals may not exist any more (FIG. 5c).

The composite membranes obtained in all of our experiments exhibit powder X-ray diffraction (XRD) patterns of the AFI structure. Some of membrane samples were also ground and examined by powder XRD. XRD patterns of the surface-grown VAPO$_4$-5 crystals (FIG. 6), CoAPO$_4$-5 crystals (FIG. 7) and AlPO$_4$-5 crystals (FIG. 8) are compatible with that of AFI material (simulated from structural parameters reported in literature (*ACS Symp. Ser.*, 218, 109 (1983)), and show a strongly enhanced intensity of the (002) peak at a Bragg angle 2 θ of 20.88° 21.16° and 20.92°, respectively. This enhanced intensity confirms the preferred vertical c-axis orientation of the hexagonal crystals.

The incorporation of vanadium and cobalt into AFI framework structure has been probed by electron spin resonance (ESR) spectroscopy. The ESR spectrum of as-prepared greenish VAPO$_4$-5 composite membrane is anisotropic with g and splitting parameters characteristic of atomically dispersed and immobile V$^{4+}$ions. ESR spectrum of the synthetic blue CoAPO$_4$-5 composite membrane shows the resonance with g∥~4.4, g⊥~1.9, indicating framework Co$^{2+}$in a distorted tetrahedral environment with presumably a high-spin state.

The proposed synthetic scheme of preparing vertically aligned zeolite crystals on a horizontally placed anodic alumina support is shown in FIG. 9. The vertically oriented growth may be related to nuclei distributed inside the cylindrical and straight channels of anodic alumina substrate (FIG. 9b). The nucleation may occur either inside the channels (heterogeneous nucleation) or in the solution (homogeneous nucleation), then transfering to the channels. Nutrients can penetrate into the channels of 200-nm-pore diameter from reaction mixtures through capillary condensation and they interact with OH groups on the wall of channels to participate in the crystallization of molecular sieve. IR spectra of the anodic alumina of the present invention shows that the anodic alumina contains OH function group, with frequency of 900~1160 cm$^{-1}$, which may participate in the molecular sieve synthesis. In addition, Sano et al. (*J. Mater. Chem.*, 2, 141 (1992)) and Valtchev et al. (*J. Chem. Soc., Chem. Commun.*, 2087 (1994)) have also suggested similar type of interaction between OH groups of cellulose and aluminosilicate species during zeolite nucleation. If the size of nuclei formed in the solution is less than the pore diameter of channel (about 200 nm), they may diffuse into the channels of support. The nanocrystals of AlPO$_4$-5(4, 20 and 70 nm sized globular particles) were observed by Caro et al. (*Adv. Mater.*, 7, 711, (1995)). The nuclei inside the channels further grow into large crystals with their c-axis preferred parallel to the channels, as depicted in FIG. 9c. In this study, not only the c-axis (i.e., [001] direction) of these crystals was found to be vertical to the substrate, the a- and b-axes were also observed to be aligned to a substantial extent.

By using the anodic alumina as the support, the orientation of the molecular sieve membrane can easily be controlled. As compared with the previous approaches, any pre- or post-treatments (such as fixing of aligned crystals by epoxy resin) and modifications of substrate(such as coating organophosphate multilayer films on Au support) is not needed. In addition, the obtained aligned molecular sieve membrane of the present invention is also better than other aligned molecular sieve composite membrane with a porous ceramics, silicon wafer or metal as the support. The anodic alumina possesses cylindrical and straight-through uniform 200-nm-pore-diameter channels with high porosity (about 30~50%) relative to porous ceramics of high resistance and low throughput, because of their nonstraight-through, low density and irregular pores. With excellent throughput, the anodic alumina still has the similar thermal stability as the other sintered porous alumina. Although the molecular sieve composite membrane of the present invention is heated to 500° C. to remove the organic base occluded in the channels of molecular sieves, the geometries of the cylindric pore and straight-through of anodic alumina membrane, as well as the surface morphology of the molecular sieve crystals are still unchanged. Moreover, the cracks, perhaps induced by thermal stress are not observed in the molecular sieve membrane. The molecular sieve phase is still strongly bounded and anchored into the anodic alumina after heat treatment.

In conclusion, the closely packed molecular sieve membrane has first successfully been in situ grown on the anodic alumina membrane support. More particularly, these surface-grown and hexagonal-shaped molecular sieve crystals are well aligned with their c-axes vertical to the anodic alumina suppport. The molecular sieve composite membrane of the present invention has the advantages of sufficient mechanical strength, thermal and chemical stability. Furthermore, the anodic alumina membrane has uniform cylindrical straight channels with high density. This allows the molecular sieve phase to be anchored into the channels (or pores) of the anodic alumina, and the molecular sieve phase to be strongly bounded to the anodic alumina support. In addition, the orientation of the molecular sieve layer can be controlled by the application of the anodic alumina.

The following examples are intended to demostrate this invention more fully without limiting its scope, since numerous modifications and variations will be apparent to those skilled in the art.

EXAMPLE 1

Preparation of Molecular Sieve VAPO$_4$-5 (AFI) Membranes

A reaction mixture was prepared by combining adequate amounts of aluminium isopropoxide, 85% phosphoric acid, tripropylamine (Pr$_3$N), vanadyl sulfate (VOSO$_4$) and de-ionized water and stirred until homogeneous. The compositions of the final reaction mixture in molar ratios were:

1.0~6.0 Pr$_3$N: 0.95–1.0 Al$_2$O$_3$: 0.95–1.0 P$_2$O$_5$: 0.05–0.1 V$_2$O$_5$: 200~600 H$_2$O.

The support used for the crystallization of molecular sieve was porous alumina membrane prepared by anodization of aluminium in a mixture of phosphoric acids. The reaction mixture was charged in a Teflon-lined stainless-steel autoclave, and the anodized alumina membrane was immersed into the reaction mixture. Then, the autoclave was sealed and treated at 180° C. for 2 days without stirring under autogenous pressure. The obtained composite VAPO$_4$-5 membranes were washed with de-ionized water under ultrasonic vibration for several times and calcined at 500° C. for 24 hours to remove the organic base occluded in the channels of molecular sieve.

The SEM micrographs of composite VAPO$_4$-5 membrane are shown in FIG. 1. It indicates that the VAPO$_4$-5 crystals on the anodic alumina were aligned to a substantial, with their c-axes vertical to the surface of the support. FIG. 6 shows the X-ray diffraction pattern of the obtained VAPO$_4$-5 composite membrane. The enhanced intensities of (002) diffraction planes also confirm the c-axes preferred orientation of these VAPO$_4$-5 crystals supported on the anodic alumina.

EXAMPLE 2

Preparation of CoAPO$_4$-5(AFI) Membranes

A reaction mixture was prepared by combining adequate amounts of aluminium isopropoxide, 85% phosphoric acid, tripropylamine (Pr$_3$N), cobalt sulfate (COSO$_4$) and de-ionized water and stirred until homogeneous. The compositions of the final reaction mixture in molar ratios were:

1.0~6.0 Pr$_3$N: 0.95–1.0 Al$_2$O$_3$: 0.95–1.0 P$_2$O$_5$: 0.05–0.1 V$_2$O$_5$: 200~600 H$_2$O.

The support used for the crystallization of molecular sieve was porous alumina membrane prepared by anodization of aluminium in a mixture of phosphoric acids. The reaction mixture was charged in a Teflon-lined stainless-steel autoclave, and the anodized alumina membrane was immersed into the reaction mixture. Then, the autoclave was sealed and treated at 180° C. for 2 days without stirring under autogenous pressure. The obtained composite CoAPO$_4$-5 membrane were washed with de-ionized water under ultrasonic vibration for several times and calcined at 500° C. for 24 hours to remove the organic base occluded in the channels of molecular sieve.

The SEM micrographs of composite CoAPO$_4$-5 membrane are shown in FIG. 2. It indicates that the CoAPO$_4$-5 crystals on the anodic alumina were aligned to a substantial, with their c-axes vertical to the surface of the support. FIG. 7 shows the X-ray diffraction pattern of the obtained CoAPO$_4$-5 composite membrane. The enhanced intensities of (002) diffraction planes also confirm the c-axes preferred orientation of these CoAPO$_4$-5 crystals supported on the anodic alumina.

EXAMPLE 3

Preparation of CoAPO$_4$-5(AFI) Membranes

A reaction mixture was prepared by combining adequate amounts of aluminium isopropoxide, 85% phosphoric acid, triethylamine (Et$_3$N), cobalt sulfate (CoSO$_4$) and de-ionized water and stirred until homogeneous. The compositions of the final reaction mixture in molar ratios were:

1.0~6.0 Pr$_3$N: 0.95–1.0 Al$_2$O$_3$: 0.95–1.0 P$_2$O$_5$: 0.05–0.1 V$_2$O$_5$: 200~600 H$_2$O.

The support used for the crystallization of molecular sieve was porous alumina membrane prepared by anodization of aluminium in a mixture of phosphoric acids. The reaction mixture was charged in a Teflon-lined stainless-steel autoclave, and the anodized alumina membrane was immersed into the reaction mixture. Then, the autoclave was sealed and treated at 180° C. for 2 days without stirring under autogenous pressure. The obtained composite CoAPO$_4$-5 membrane were washed with de-ionized water under ultrasonic vibration for several times and calcined at 500° C. for 24 hours to remove the organic base occluded in the channels of molecular sieve.

The morphology of composite CoAPO$_4$-5 membrane are similar to that of FIG. 2. It indicates that the CoAPO$_4$-5 crystals on the anodic alumina were aligned to a substantial, with their c-axes vertical to the surface of the support. The X-ray diffraction pattern of the obtained CoAPO$_4$-5 composite membrane also shows the enhanced intensities of (002) diffraction planes, confirming the c-axes preferred orientation of these CoAPO$_4$-5 crystals supported on the anodic alumina.

EXAMPLE 4

Preparation of Molecular Sieve AlPO$_4$-5 (AFI) Membranes

A reaction mixture was prepared by combining adequate amounts of aluminium isopropoxide, 85% phosphoric acid, tripropylamine (Pr$_3$N) and de-ionized water and stirred until homogeneous. The composition of the final reaction mixture in molar ratios was:

1.0~6.0 Pr$_3$N: 0.95–1.0 Al$_2$O$_3$: 0.95–1.0 P$_2$O$_5$: 0.05–0.1 V$_2$O$_5$: 200~600 H$_2$O.

The support used for the crystallization of molecular sieve was porous alumina membrane prepared by anodization of aluminium in a mixture of phosphoric acids. The reaction mixture was charged in a Teflon-lined stainless-steel autoclave, and the anodized alumina membrane was immersed into the reaction mixture. Then, the autoclave was sealed and treated at 180° C. for 2 days without stirring under autogenous pressure. The obtained composite AlPO$_4$-5 membrane were washed with de-ionized water under ultrasonic vibration for several times and calcined at 500° C. for 24 hours to remove the organic base occluded in the channels of molecular sieve.

The SEM micrographs of composite AlPO$_4$-5 membrane are shown in FIG. 3. It indicates that the AlPO$_4$-5 crystals on the anodic alumina were aligned to a substantial, with their c-axes vertical to the surface of the support. FIG. 8 shows the X-ray diffraction pattern of the obtained AlPO$_4$-5 composite membrane. The enhanced intensities of (002) diffraction planes also confirm the c-axes preferred orientation of these AlPO$_4$-5 crystals supported on the anodic alumina.

TABLE 1

AlPO$_4$-5 (AFI): microporous molecular sieve, created by Union
    Carbide Corporation
    Related Materials:    VAPO-5
                            CoAPO-5
                            MeAlPO-5 (metal containing
                            aluminophosphate)
    Structure (ACS Symp. Ser. 1983, 218, 109.)
    CHEMICAL COMPOSITION: TPAOH * 12 AlPO$_4$
        (TPAOH: tetrapropylammonium hydroxide)
    SYMMETRY: hexagonal
    SPACE GROUP: P6cc
    UNIT CELL PARAMETERS: $\alpha$ = 13.726 Å, c = 8.484 Å, $\gamma$ = 120°
    PORE STRUCTURE: uni-dimensional 12-ring system
ZSM-5 (MFI): microporous zeolite, created by Mobil Oil Corporation
    Related Materials: Silicalite
                           Silicalite-1
    Structure (J. Phys. Chem. 1981, 85, 2238.)
    CHEMICAL COMPOSITION: (TPA, Na)$_2$O * Al$_2$O$_3$ * 5–10 SiO$_2$ *
        4 H$_2$O                        (TPA tetrapropylammonium)
    SYMMETRY: orthorhombic
    SPACE GROUP: Pnma
    UNIT CELL PARAMETERS: $\alpha$ = 20.1 Å, b = 19.9 Å, c = 13.4 Å
    PORE STRUCTURE: three-dimensional intersecting 10-member
    rings; pore opening: 5.3 × 5.6 Å and 5.1 × 5.5 Å

TABLE 2

Faujasite (FAU): microporous zeolite, natural
   Related Materials: Linde type X
                        Linde type Y
   Structure (Zeo. Mol. Sieve. 1974, 218.)
   CHEMICAL COMPOSITION:
                        $Na_{20}Ca_{12}Mg_8(Al_{60}Si_{132}O_{384}) * 235\ H_2O$
   SYMMETRY: cubic
   SPACE GROUP: Fd3m
   UNIT CELL PARAMETERS: $\alpha = 24.6$ Å
   PORE STRUCTURE: three-dimensional 12-member rings; pore opening: 7.4 Å
MCM-41: mesoporous zeolite, created by Mobile Oil Corporation
   Structure (Chem. Mater. 1996, 8, 1147.)
   CHEMICAL COMPOSITION: $SiO_2$
   SYMMETRY: hexagonal
   SPACE GROUP: P6m
   PORE STRUCTURE: uni-dimensional channels; 20–100 Å pore opening

What is claimed is:

1. A molecular sieve composite membrane comprising:

a) an anodic alumina membrane as a support, said anodic alumina membrane having a packed array of columnar hexagonal cells with straight through uniform channels; and b) a $VAPO_4$-5 molecular sieve membrane grown hydrothermally in situ on said anodic alumina membrane, wherein the crystals of the molecular sieve membrane are in bundles and aligned uni-directionally on said anodic alumina membrane support with their c-axis vertical to the support and their a- and b-axes essentially aligned, and wherein the $VAPO_4$-5 synthesis mixture consists of aluminum isopropoxide, phosphoric acid, vanadyl sulfate, tripropyl-amine ($Pr_3N$) and water and the reaction mixture has a molar ratio of 1–20 $Pr_3N$:1–2 $Al_2O_3$:1–2 $P_2O_5$:0.05–0.2 $V_2O_5$:200–600 $H_2O$.

2. The molecular sieve composite membrane as defined in claim 1, wherein the crystals of the molecular sieve membrane are about the same length.

3. A molecular sieve composite membrane comprising:

a) an anodic alumina membrane as a support, said anodic alumina membrane having a packed array of columnar hexagonal cells with straight through uniform channels; and b) a $CoAPO_4$-5 molecular sieve membrane grown hydrothermally in situ on said anodic alumina membrane, wherein the crystals of the molecular sieve membrane are in bundles and aligned uni-directionally on said anodic alumina membrane support with their c-axis vertical to the support and their a- and b-axes essentially aligned and wherein the $CoAPO_4$-5 synthesis mixture consists of aluminum isopropoxide, phosphoric acid, cobalt sulfate, tripropylamine ($Pr_3N$) and water and the reaction mixture has a molar ratio of 1–20 $Pr_3N$:1–2 $Al_2O_3$:1–2 $P_2O_5$:0.5–0.2 CoO:200–600 $H_2O$.

4. The molecular sieve composite membrane as defined in claim 3, wherein the crystals of the molecular sieve membrane are about the same length.

5. A molecular sieve composite membrane comprising:

a) an anodic alumina membrane as a support, said anodic alumina membrane having a packed array of columnar hexagonal cells with straight through uniform channels; and b) a $CoAPO_4$-5 molecular sieve membrane grown hydrothermally in situ on said anodic alumina membrane, wherein the crystals of the molecular sieve membrane are in bundles and aligned uni-directionally on said anodic alumina membrane support with their c-axis vertical to the support and their a- and b-axes essentially aligned, and wherein the $CoAPO_4$-5 synthesis mixture consists of aluminum isopropoxide, phosphoric acid, cobalt mitrite, tripropylamine ($Pr_3N$) and water and the reaction mixture has a molar ratio of 1–20 $Pr_3N$:1–2 $Al_2O_3$:1–2 $P_2O_5$:0.5–0.2 CoO:200–600 $H_2O$.

6. The molecular sieve composite membrane as defined in claim 5, wherein the crystals of the molecular sieve membrane are about the same length.

7. A molecular sieve composite membrane comprising:

a) an anodic alumina membrane as a support, said anodic alumina membrane having a packed array of columnar hexagonal cells with straight through uniform channels; and b) a $CoAPO_4$-5 molecular sieve membrane grown hydrothermally in situ on said anodic alumina membrane, wherein the crystals of the molecular sieve membrane are in bundles and aligned uni-directionally on said anodic alumina membrane support with their c-axis vertical to the support and their a- and b-axes essentially aligned and wherein the $CoAPO_4$-5 synthesis mixture consists of aluminum isopropoxide, phosphoric acid, cobalt sulfate, triethylamine ($Et_3N$) and water and the reaction mixture has a molar ratio of 1–20 $Et_3N$:1–2 $Al_2O_3$:1–2 $P_2O_5$:0.05–0.2 CoO:200–600 $H_2O$.

8. The molecular sieve composite membrane as defined in claim 7, wherein the crystals of the molecular sieve membrane are about the same length.

9. A molecular sieve composite membrane comprising:

a) an anodic alumina membrane as a support, said anodic alumina membrane having a packed array of columnar hexagonal cells with straight through uniform channels; and b) a $AlPO_4$-5 molecular sieve membrane grown hydrothermally in situ on said anodic alumina membrane, wherein the crystals of the molecular sieve membrane are in bundles and aligned uni-directionally on said anodic alumina membrane support with their c-axis vertical to the support and their a- and b-axes essentially aligned, and wherein the $AlPO_4$-5 synthesis mixture consists of aluminum isopropoxide, phosphoric acid, tripropylamine ($Pr_3N$) and water and the reaction mixture has a molar ratio of 1–20 $Pr_3N$:1–2 $Al_2O_3$:1–2 $P_2O_5$:200–600 $H_2O$.

10. The molecular sieve composite membrane as defined in claim 9, wherein the crystals of the molecular sieve membrane are about the same length.

\* \* \* \* \*